United States Patent
Gondek et al.

(10) Patent No.: US 10,540,747 B2
(45) Date of Patent: Jan. 21, 2020

(54) DIGITAL IMAGE SCALING

(71) Applicant: Hewlett-Packard Development Company, L.P., Houston, TX (US)

(72) Inventors: Jay S Gondek, Camas, WA (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/558,944

(22) PCT Filed: Jun. 26, 2015

(86) PCT No.: PCT/US2015/037923
§ 371 (c)(1),
(2) Date: Sep. 15, 2017

(87) PCT Pub. No.: WO2016/209254
PCT Pub. Date: Dec. 29, 2016

(65) Prior Publication Data
US 2018/0077315 A1     Mar. 15, 2018

(51) Int. Cl.
*G06T 3/40* (2006.01)
*H04N 1/409* (2006.01)
*H04N 1/393* (2006.01)

(52) U.S. Cl.
CPC ............ *G06T 3/403* (2013.01); *G06T 3/4053* (2013.01); *H04N 1/3935* (2013.01); *H04N 1/4092* (2013.01)

(58) Field of Classification Search
CPC ...... H04N 1/4092; G06T 3/403; G06T 3/4069
See application file for complete search history.

(56) References Cited

U.S. PATENT DOCUMENTS

| | | | |
|---|---|---|---|
| 5,757,982 A | 5/1998 | Tepmongkol | |
| 7,139,442 B2 | 11/2006 | Ebner et al. | |
| 7,538,905 B2 | 5/2009 | Keithley | |
| 8,391,647 B1 | 3/2013 | Gondek | |
| 8,417,049 B2 | 4/2013 | Maurer | |
| 2005/0162427 A1 | 7/2005 | Momozono et al. | |
| 2006/0176315 A1* | 8/2006 | Sellers | G06T 3/403 345/606 |

(Continued)

FOREIGN PATENT DOCUMENTS

KR     10-1106613     1/2012

OTHER PUBLICATIONS

Kim, et al. Fast Binary Image Resolution Increasing by K—Nearest Neighbor Learning. Dept. Eng. Sistemas Electronics, Univ. de Sao Paulo, Brazil, Sep. 2000 ~ IEEE ~ 4 pages.

*Primary Examiner* — Peter K Huntsinger
(74) *Attorney, Agent, or Firm* — HP Inc. Patent Department

(57) ABSTRACT

Examples include computing devices, processes, and/or machine-readable storage mediums. Examples analyze a region of pixels for a digital image to determine a set of diagonal direction pixel differences corresponding to a target pixel. Examples analyze the region of pixels to determine diagonal variances corresponding to the target pixel. Examples scale the digital image by processing the target pixel into a set of subpixels based at least in part on the set of diagonal direction pixel differences and the diagonal variances.

20 Claims, 10 Drawing Sheets

(56) References Cited

U.S. PATENT DOCUMENTS

2008/0239335 A1 10/2008 Lee et al.
2010/0074558 A1 3/2010 Lim
2011/0085742 A1 4/2011 Maurer
2014/0168511 A1 6/2014 Gong et al.

* cited by examiner

DIGITAL IMAGE SCALING

BACKGROUND

Digital images generally comprise a plurality of pixels, where the pixels correspond to a smallest controllable/addressable element of the digital image. Pixels generally comprise pixel values that correspond to various visual components of the respective pixel. Resolution of a digital image generally indicates the detail an image holds, where resolution may depend on a quantity of pixels in a digital image and a size of the pixels of the digital image.

DRAWINGS

Figure 3A:
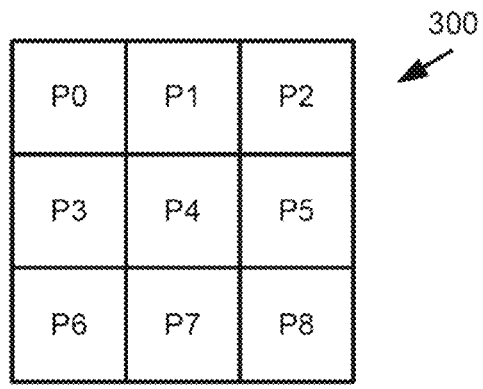
Figure 3B:
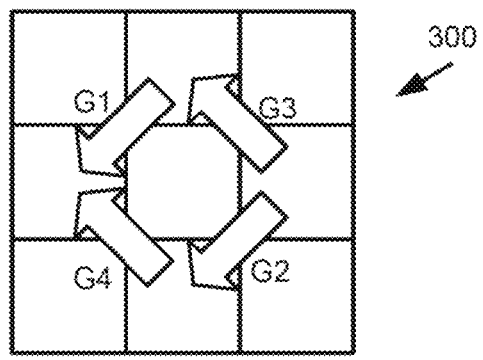
Figure 3C:
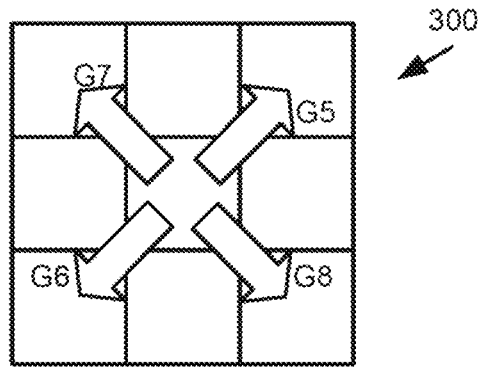

FIGS. 3A-C are block diagrams of example pixel regions and example diagonal direction pixel differences that may be determined by an example printing device.

Figure 4:
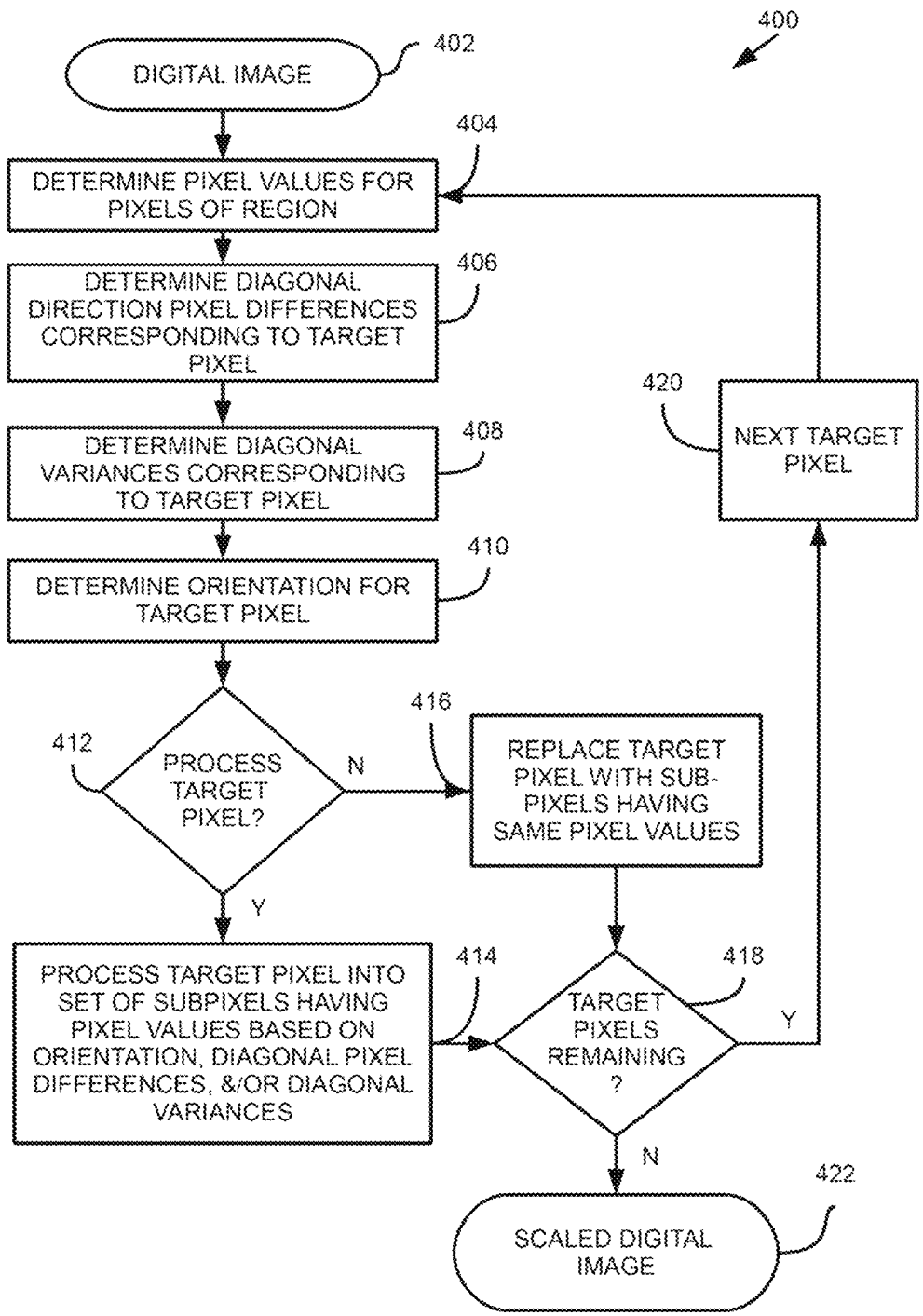

FIG. 4 is a flowchart that illustrates an example sequence of operations that may be performed by an example computing device.

Figure 5:
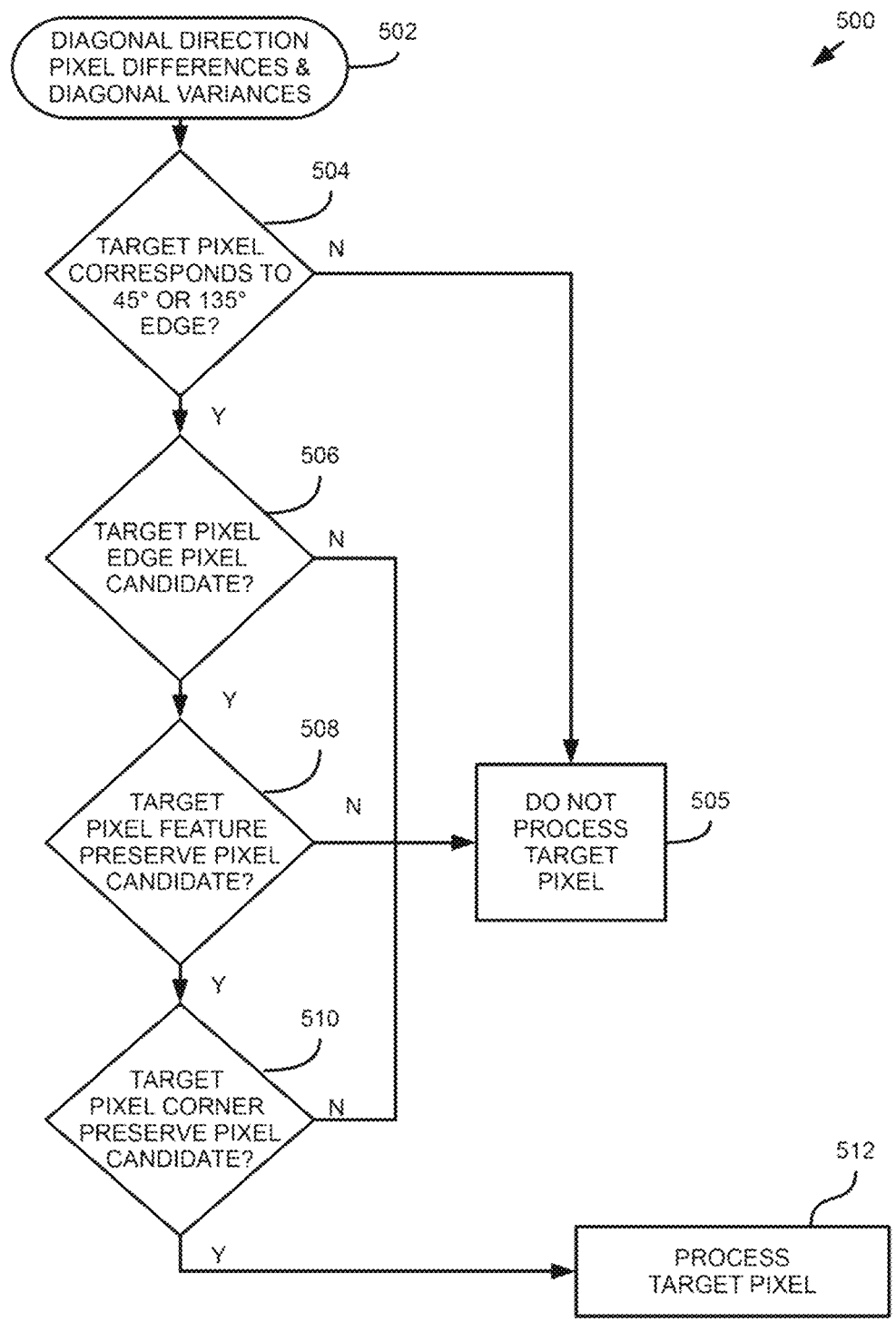

FIG. 5 is a flowchart that illustrates an example sequence of operations that may be performed by an example computing device.

Figure 6A:
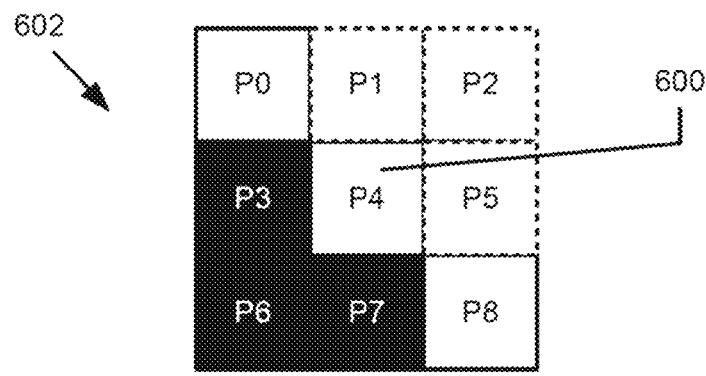
Figure 6B:
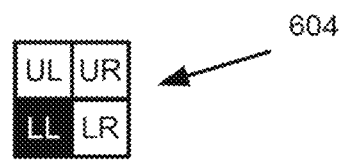
Figure 6C:
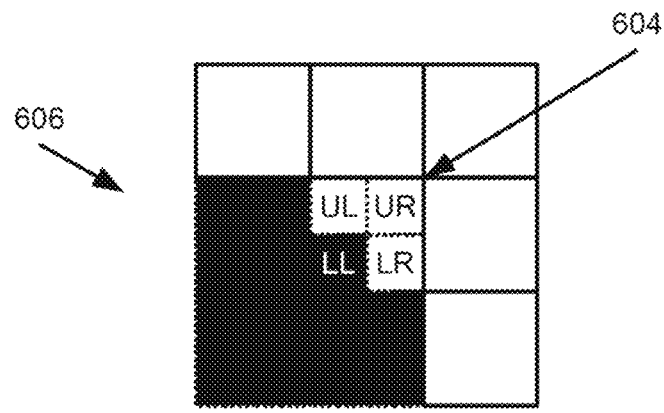

FIGS. 6A-C are block diagrams that illustrate an example processing of pixels that may be performed by an example computing device.

Figure 7A:
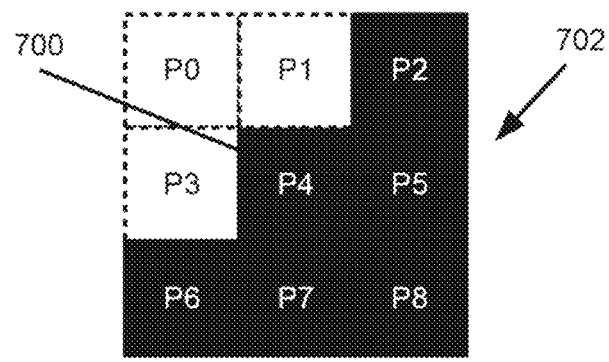
Figure 7B:
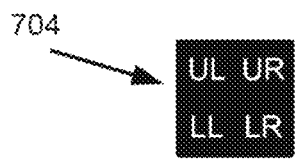
Figure 7C:
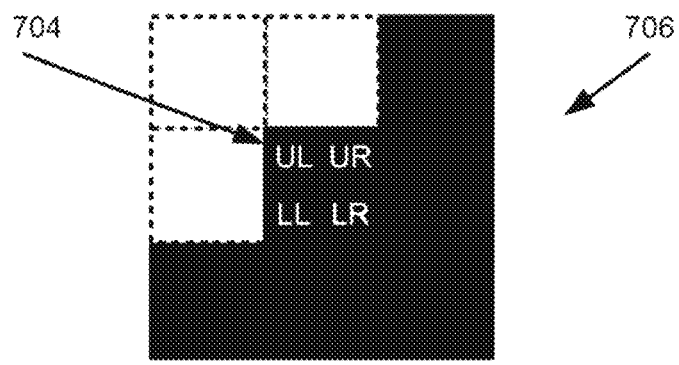

FIGS. 7A-C are block diagrams that illustrate an example processing of pixels that may be performed by an example computing device.

Figure 8A:
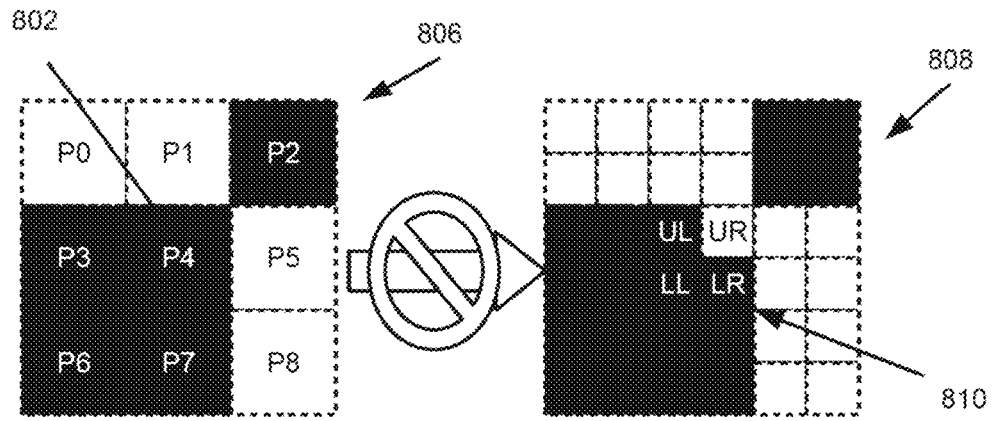
Figure 8B:
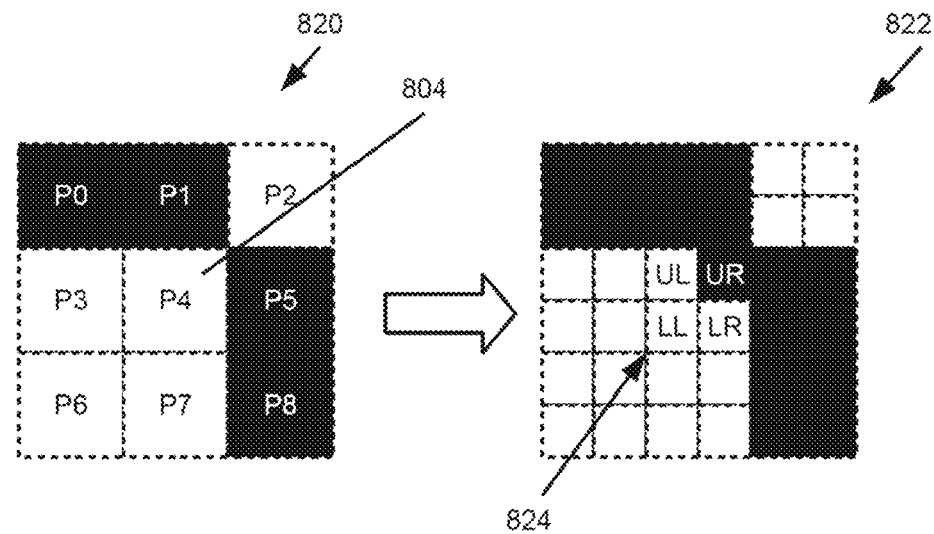

FIGS. 8A-B are block diagrams that illustrate examples of a feature preservation pixel determination that may be performed for a target pixel by an example computing device.

Figure 9A:
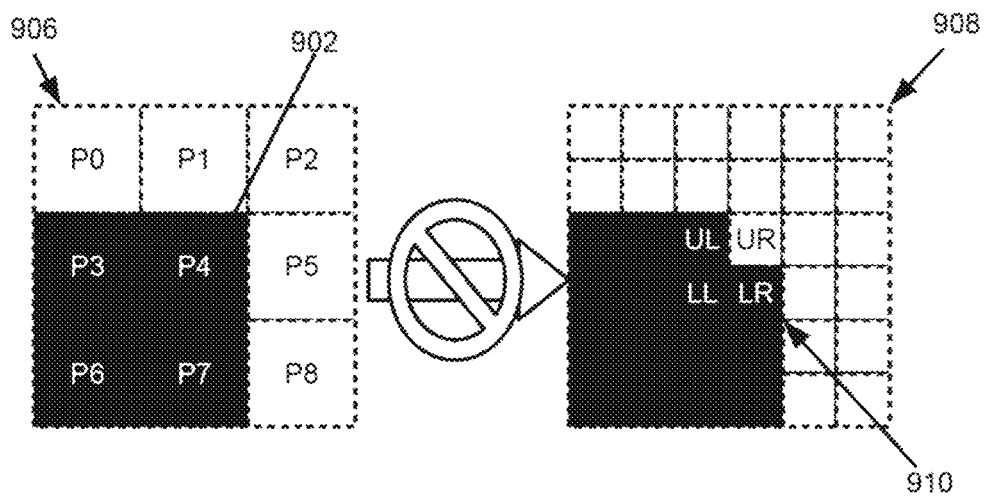
Figure 9B:
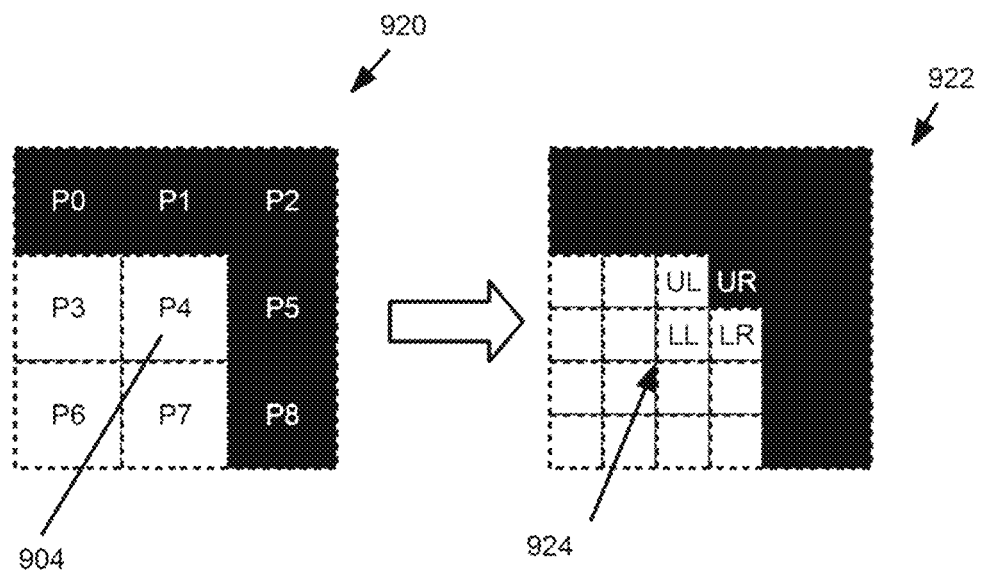

FIGS. 9A-B are block diagrams that illustrate examples of a corner preserve pixel determination that may be performed for a target pixel by an example computing device.

Figure 10A:
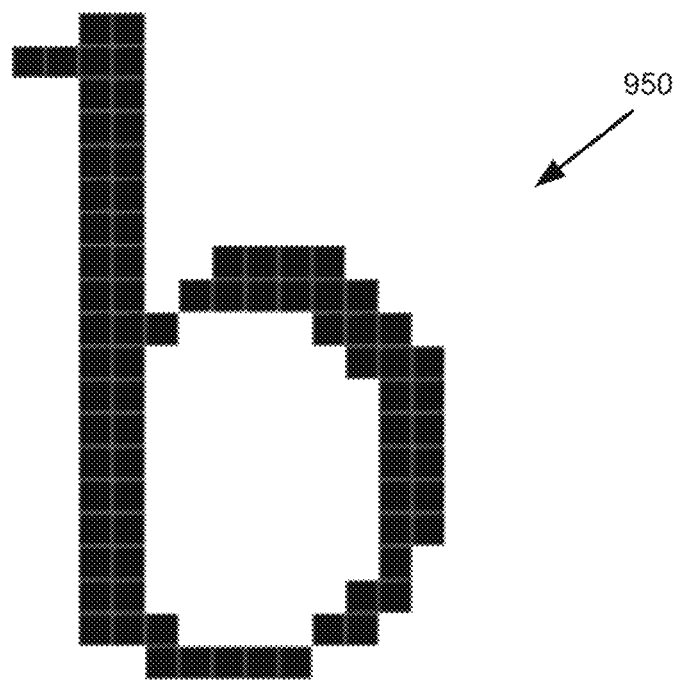
Figure 10B:
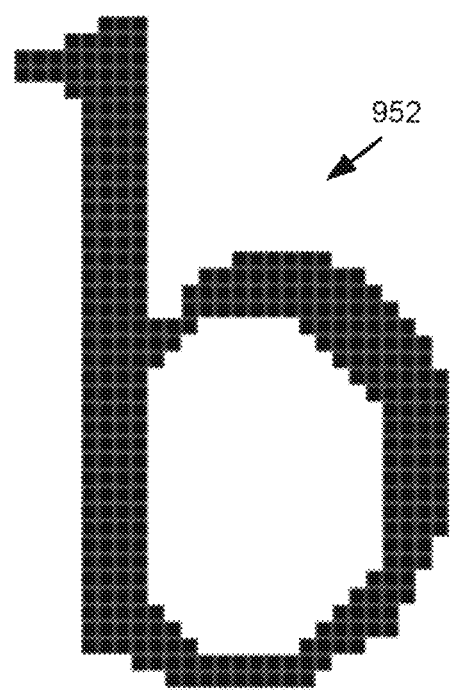

FIGS. 10A-B are block diagrams that illustrate an example processing of a digital image that may be performed by an example computing device.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Generally, digital image scaling corresponds to a process by which a size of pixels and/or a number of pixels of a digital image may be adjusted. For pixels of a digital image, each pixel generally includes one or more pixel values that correspond to various visual components. Examples of visual components that may be expressed in pixel values include color, opacity, intensity, hue, saturation, brightness, luma, etc. A pixel value generally indicates a numerical value of a scale for a visual component. For example, in an 8-bit RGB color system, for a pixel, the pixel may comprise a 3-bit pixel value for the red color component, a 3-bit pixel value for the green color component, and a two-bit pixel value for the blue color component.

In some examples, a data processing system may analyze data of a digital image (e.g., pixels) and adjust pixel size and/or quantity of pixels in the digital image to thereby adjust a size of the digital image. Examples of the disclosure may process a target pixel into a set of sub-pixels that comprise a fractional area of the target pixel, where pixel values of the sub-pixels may be set based at least in part on pixel values of neighboring pixels, diagonal direction pixel differences corresponding to the target pixel, and/or diagonal variances corresponding to the target pixel.

Some examples of image scaling may be referred to as upscaling, where upscaling generally increases resolution of a digital image by increasing a number of pixels and/or decreasing a pixel size of one or more pixels. While increasing resolution of a digital image may generally be desirable, increases in pixel quantity and/or reduction in pixel size may lead to reduced image quality (which may result in a grainy upscaled image) and/or visual inaccuracies in the upscaled digital image. Furthermore, scaling digital images generally requires data processing resources for the data processing operations associated with the scaling. Hence, scaling of a digital image is generally a balance between processing resource usage and image quality increase. Moreover, some processes for image scaling may not be suitable for various types of image data, such as text or other types of graphics. Furthermore, some processes for image scaling may not be suitable for particular types of image data of a digital image. For example, some scaling processes may introduce intermediate colors along edges in a digital image, which may cause a blurry/grainy appearance.

In some examples of the description, systems, processes, and/or computer program products may scale a digital image by processing one or more target pixels of the digital image based at least in part on a set f diagonal direction pixel differences corresponding to each pixel and/or diagonal variances corresponding to each pixel. Generally, a diagonal direction pixel difference may correspond to a difference between pixel values of diagonal neighbor pixels.

Some examples of the description may scale a digital image prior to printing the digital image with a printing device onto a medium. Generally, a digital image to be printed by a printing device may be referred to as print content. For example, print content may be upscaled from a print resolution of 300 pixels per inch (PPI) to a print resolution of 600 PPI. As another example, print content may be upscaled from a print resolution of 600 PPI to 1200 PPI. Other examples may scale a digital image for output on other types of output devices, such as a monitor, touch-screen, etc.

Figure 1:
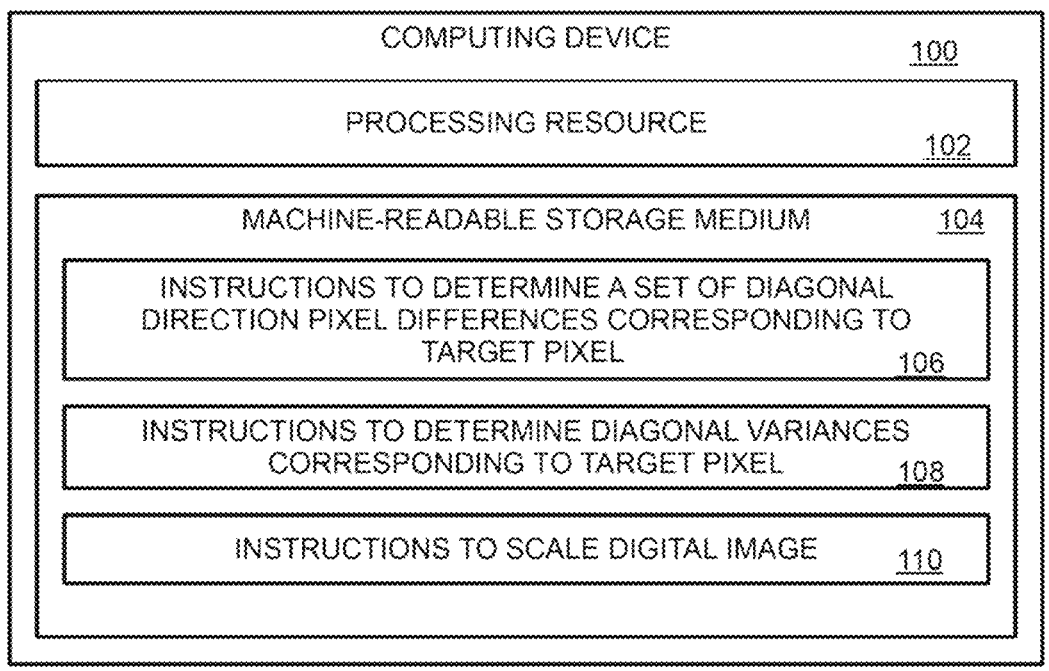
FIG. 1 is a block diagram of an example computing device.

Turning now to FIG. 1, this figure provides a block diagram that illustrates an example computing device 100. Examples of a computing device as disclosed herein include a personal computer, a portable electronic device (e.g., a smart phone, a tablet, a laptop, a wearable device, etc.), a workstation, smart device, server, a printing device, and/or any other such data processing devices. In this example, the computing device 100 comprises a processing resource 102 and a machine-readable storage medium 104, which may be referred to as a memory and/or a memory resource. In the examples described herein, a processing resource 102 may include at least one hardware-based processor. Furthermore, the processing resource 102 may include one processor or multiple processors, where the processors may be configured in a single computing device 102 or distributed across multiple computing devices connected locally and/or remotely. As will be appreciated, a processing resource 102 may comprise one or more general purpose data processors and/or one or more specialized data processors. For example, the processing resource 102 may comprise an central processing unit (CPU), a graphics processing unit (GPU), an application-specific integrated circuit (ASIC), and/or other such configurations of logical components for data processing.

The machine-readable storage medium 104 may represent the random access memory (RAM) devices comprising the main storage of the example computing device 100, as well as any supplemental levels of memory, e.g., cache memories, non-volatile or backup memories (e.g., programmable or flash memories), read-only memories, etc. In addition, machine-readable storage medium 104 may be considered to include memory storage physically located elsewhere, e.g., arty cache memory in a microprocessor, as well as any storage capacity used as a virtual memory, e.g., as stored on a mass storage device or on another computing device in communication with the example computing device 100. Furthermore, the machine-readable storage medium 104 may be non-transitory.

Generally, the machine-readable storage medium 104 may be encoded with and/or store instructions that may be executable by the processing resource 102, where execution of such instructions may cause the processing resource 102 and/or computing device 100 to perform the functionalities, processes, and/or sequences of operations described herein. In this example, the machine-readable storage medium 124 comprises instructions for processing a digital image. In particular, the machine-readable storage medium 104 comprises instructions to determine a set of diagonal direction pixel differences corresponding to a target pixel based on pixel values for each pixel of a region of pixels associated with the target pixel 106. In some examples, instructions 106 may determine the set of diagonal pixel differences as described below with regard to FIGS. 3A-C and example equations (1) to (8). The machine-readable storage medium 104 comprises instructions to determine diagonal variances corresponding to the target pixel based at least in part on the pixel values of the pixels of the region associated with the target pixel 108. In some examples, the instructions 108 may determine the diagonal variances as described below with regard to FIGS. 3A-C and the example equations (9) and (10). The machine-readable storage medium 104 further comprises instructions to scale the digital image by processing the target pixel into a set of sub-pixels based at least in part on the set of diagonal direction pixel differences and the diagonal variances 110. In some examples, the instructions 110 may scale the digital image as described below with regard to the example flowcharts of FIGS. 4 and 5, the example conditions (A) to (H), and/or the example equations (11) and (12) described below.

While not shown in FIG. 1, for interface with a user or operator, the example computing device 100 may include a user interface incorporating one or more user input/output devices, e.g., one or more buttons, a display, a touchscreen, a speaker, etc. The user interface may therefore communicate data to the processing resource 102 and receive data from the processing resource 102. For example, a user may input one or more selections via the user interface, and the processing resource 102 may cause data to be output on a screen or other output device of the user interface. Furthermore, the computing device 100 may comprise a network interface device. Generally, the network interface device comprises one or more hardware devices to communicate data over one or more communication networks, such as a network interface card. In some examples, the computing device 100 may be connected to an external output device and/or a printing device. An external output device may comprise a monitor, a touchscreen, a projection device, a personal display device, and/or other such types of visual output devices. A printing device may comprise a device configured to print content onto a physical medium.

Figure 2:
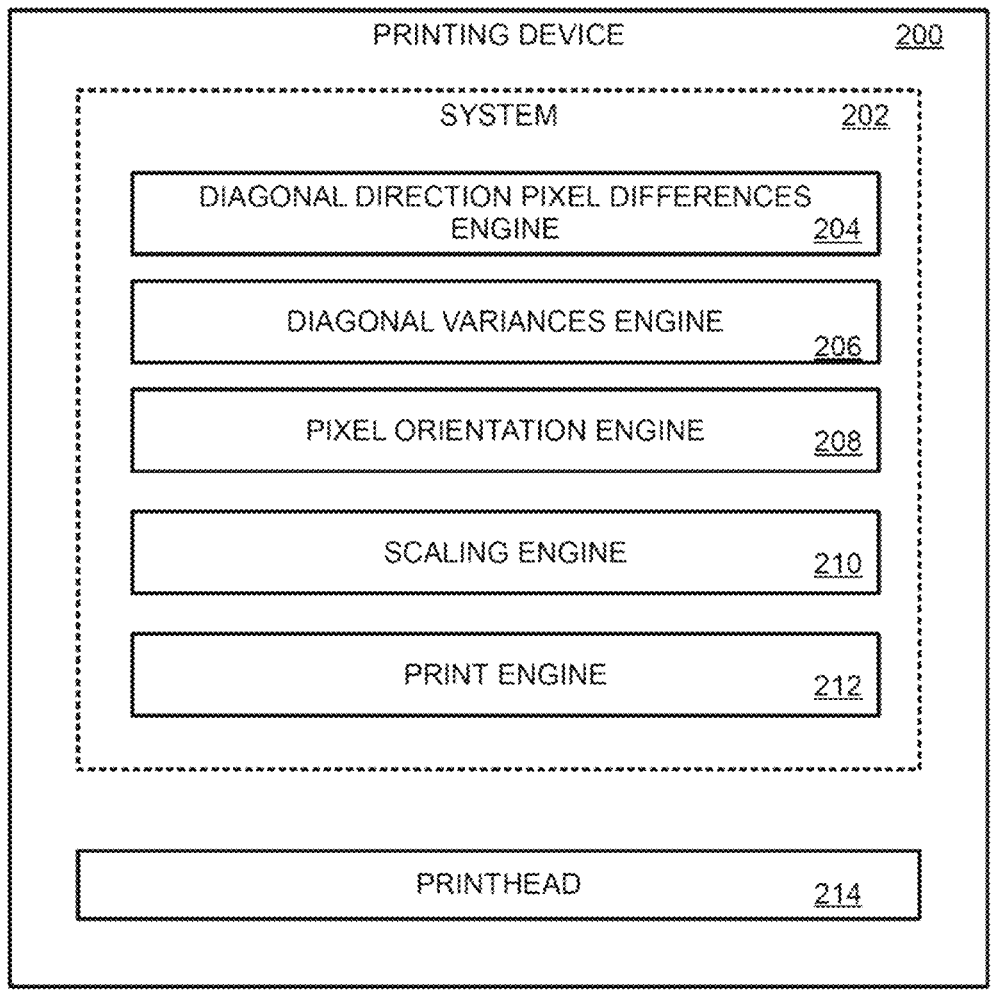
FIG. 2 is a block diagram of an example printing device.

FIG. 2 provides a block diagram of an example printing device 200. Printing devices, as described herein, may generally be used to print content onto a physical medium (also referred to as media), such as paper, Examples of printing devices include ink-based printing devices, toner-based printing devices, thermal printers, dye-based printers, etc. In this example, the printing device 200 comprises a system 202 including engines 204-212 for analyzing and scaling a digital image. As will be appreciated, a digital image communicated to a printing device for printing thereby may be referred to as print content. Furthermore, engines, as described herein, may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, a computing device implementing such engines may include the machine-readable storage medium storing the instructions and the processing resource to execute the instructions, or the machine-readable storage medium may be separately stored and accessible by the computing device and the processing resource. In some examples, engines may be implemented in circuitry.

In the example printing device 200 of FIG. 2, the system 202 includes a diagonal direction pixel differences engine 204 to analyze a region of pixels corresponding to a target pixel of the digital image to determine a set of diagonal direction pixel differences for the region of pixels. The system 202 further comprises a diagonal variances engine 206 to analyze the region of pixels to determine diagonal variances corresponding to the target pixel. The system 202 comprises a process determine engine 208 to determine whether to process the target pixel based at least in part on the set of diagonal direction pixel differences and the diagonal variances. In addition, the system 202 includes a scaling engine 210 to scale the digital image by processing the target pixel into a set of sub-pixels based at least in part on the set of diagonal direction pixel differences and the diagonal variances. In addition, the system 202 includes a print engine 212 to cause printing of the scaled digital image by a printhead 214 of the printing device 200 onto a physical medium.

As will be appreciated, the operations and sequences of operations described with regard to engines 204-212 may be performed in one or more engines that may be implemented in a printing device 200 and/or other such computing device. Generally, examples of computing devices, such as printing devices, described herein may not be limited to the specific implementations of engines illustrated in this example. In this regard, some examples of computing devices may be configured with more or less engines, where engines may be configured to perform more or less operations. Furthermore, in some examples, the engines may be implemented by execution of instructions with one or more processing resources to cause the processing resources to perform the corresponding operations, FIGS. 3A-C provide block diagrams to illustrate an example determination of a set of diagonal direction pixel differences corresponding to a target pixel. In this example, a region of pixels 300 is a 3 pixel by 3 pixel (e.g., 3×3)

region that comprises nine pixels. As shown in FIG. 3A, the nine pixels (labeled 'P0' to 'P8') of the region of pixels correspond to a target pixel (which, in this example, is labeled 'P4'), In this example, the pixel labels P0 to P8 also reference a pixel value of the respective pixel. As discussed above, a pixel value generally corresponds to a visual component of the pixel. In some examples, the pixel value that may be analyzed may correspond to luma. In other examples, the pixel value that may be analyzed may correspond to intensity, color, etc. As will be appreciated, the pixel values used for analysis may be based at least in part on the color space of the digital image and/or printing device 200. With regard to FIG. 3A, the region of pixels 300 may be referred to as a pixel neighborhood. In this regard, the pixels P0 to P8 may be referred to as neighboring pixels. For example, with regard to pixel P4: pixels P1 and P7 may be described as vertical neighbors; pixels P3 and P5 may be referred to as horizontal neighbors; and P0, P2, P8, and P8 may be referred to as diagonal neighbors. Similarly, pixels P1 and P3 may be referred to as diagonal neighbors: pixels P1 and P5 may be referred to as diagonal neighbors: pixels P3 and P7 may be referred to as diagonal neighbors; and pixels P5 and P7 may be referred to as diagonal neighbors.

FIGS. 3B and 3C illustrate example diagonal direction pixel differences that may be determined that correspond to the target pixel P4. As shown in FIG. 3B, a first diagonal direction pixel difference (labeled 'G1') a second diagonal direction pixel difference (labeled 'G2'), a third diagonal direction pixel difference (labeled 'G3'), and a fourth diagonal direction pixel difference (labeled 'G4') are illustrated. As will be appreciated, each diagonal direction pixel difference is determined based at least in part on a pixel value of two pixels of the region corresponding to the diagonal direction pixel difference. For example, the diagonal direction pixel differences of FIG. 3B may be determined based at least in part on the following equations:

$$G1 = \frac{P1 - P3}{4};\qquad(1)$$

$$G2 = \frac{P5 - P7}{4};\qquad(2)$$

$$G3 = \frac{P5 - P1}{4};\qquad(3)$$

$$G4 = \frac{P7 - P3}{4}.\qquad(4)$$

Similarly, in some examples, the diagonal pixel differences of FIG. 3C may be determined based at least in part on the following equations:

$$G5 = \frac{P4 - P2}{4};\qquad(5)$$

$$G6 = \frac{P4 - P6}{4};\qquad(6)$$

$$G7 = \frac{P4 - P0}{4};\qquad(7)$$

$$G8 = \frac{P4 - P8}{4}.\qquad(8)$$

In addition, diagonal variances across the target pixel may be determined based at least in part on the pixel values of pixels of the region and/or based at least in part on the set of diagonal direction pixel differences the region. For example, the diagonal variances across the target pixel may be determined based at least in part on the following equations:

$$V5 = \frac{G5 + G6}{2};\qquad(9)$$

$$V6 = \frac{G7 + G8}{2}.\qquad(10)$$

With regard to the example equations provided above, it will be appreciated that the denominator of each example equation may vary, where the value adjusts the range of possible values and/or may increase/decrease a significance of various other values and characteristics.

As illustrated by example equations (1) to (10) and FIGS. 3A-C, diagonal pixel differences associated with a target pixel generally correspond to pixel value differences determined from diagonally neighboring pixels associated with the target pixel. For example, the example diagonal pixel differences G1 to G4 generally correspond to pixel value differences between a vertical neighbor pixel of the target pixel and a horizontal neighbor pixel of the target pixel. In addition, the example diagonal pixel differences G5 to G8 generally correspond to pixel value differences between a diagonal neighbor and the target pixel. Moreover, as illustrated by way of the examples, diagonal pixel differences generally correspond to pixels of a region associated with a target pixel that may correspond to a 45° sloped edge or a 135° sloped edge. For example, referring to the example diagonal pixel differences of FIGS. 3B and C, diagonal pixel differences G3, G4, G7, and G8 generally correspond to a 45° sloped edge, and diagonal pixel differences G1, G2, G6, and G5 generally correspond to a 135° sloped edge. Furthermore, diagonal variances generally correspond to a variance in opposite direction diagonal pixel differences across a target pixel. For example, the example variance V5 of example equation (9) generally corresponds to diagonal direction pixel differences G5 and G6 across the target pixel P4 that may be associated with a 135° sloped edge, and the example variance V6 of example equation (10) general corresponds to diagonal direction pixel differences G7 and G8 across the target pixel P4 that may be associated with a 45° sloped edge.

In some examples, the diagonal direction pixel differences may be configured to facilitate the determination of whether the target pixel corresponds to a 45° edge or a 135° edge. For example, with regard to the example diagonal direction pixel differences of G1 to G8 of FIGS. 3B-C and/or the example equations (1) to (8), the pixel differences G1, G2, G5, and G8 may be used to determine whether the target pixel corresponds to a 135° sloped edge, and the pixel differences G3, G4, G7, and G8 may be used to determine whether the target pixel corresponds to a 45° sloped edge. In addition, in some examples, the diagonal variances corresponding to the target pixel may be configured to facilitate the determination of whether the target pixel corresponds to 45° edge or a 135° edge. With regard to the example equations (9) and (10), V5 may be used to determine whether the target pixel corresponds to a 135° sloped edge, and V6 may be used to determine whether the target pixel corresponds to a 45° sloped edge.

FIGS. 4 and 5 provide flowcharts that provide example sequences of operations that may be performed by an example computing device, such as a printing device, and/or a processing resource thereof to perform example processes and methods of the disclosure. In some examples, the operations included in the flowcharts may be embodied in a memory (such as the machine-readable storage medium 104 of FIG. 1) in the form of instructions that may be, executable by a processing resource to cause the computing device (e.g., the computing device 100 of FIG. 1, the printing device 200 of FIG. 2, etc.) to perform the operations corresponding to the instructions. Additionally, the examples provided in FIGS. 4 and 5 may be embodied in computing devices, machine-readable storage mediums, processes, and/or methods. In some examples, the example processes and/or methods disclosed in the flowcharts of FIGS. 4 and 5 may be performed by one or more engines implemented in a computing device, such as the example engines 204-212 of FIG. 2.

FIG. 4 is a flowchart 400 that illustrates an example sequence of operations that may be performed by a computing device to process a digital image (block 402). As shown, the computing device determines pixel values for a region of pixels corresponding to a target pixel (block 404). Generally, a size of the region of pixels used for analyzing a target pixel may be predefined, where a larger size may require more processing resources. In some examples, the region of pixels may be a three-pixel by three-pixel (3×3) square with the target pixel in the center (i.e., P4 as illustrated in FIG. 3A). Therefore, if the region of pixels is a 3×3 square, the computing device determines a pixel value for each of the nine pixels. As discussed previously, a pixel may comprise one or more pixel values that correspond to various visual components of the pixel. The type of pixel value used for analysis as described herein may be predefined. For example, the digital image may comprise a red color component value, a green color component value, a blue color component value, and an intensity value, and the type of pixel value used for analysis may be luma. Similarly, a type of pixel value used for analysis may be intensity.

The computing device determines a set of diagonal direction pixel differences corresponding to the target pixel based on the pixel values of the pixels of the region (block 406). In some examples, the computing device may determine the set of diagonal direction pixel differences based at least in part on the pixel values of corresponding pixels of the region of pixels. For example, the computing device may determine the diagonal direction pixel differences corresponding to the target pixel based at least in part on the example equations (1) to (8). In some examples, the set of pixel differences may be determined in block 406 as described above with regard to FIGS. 3A-C and the example equations (1) to (8). Furthermore, the computing device determines diagonal variances corresponding to the target pixel (block 408). In some examples, the computing device may determine the diagonal variances corresponding to the target pixel based at least in part on pixel values of pixels of the region and/or one or more diagonal direction pixel differences of the set. For example, the computing device may determine the diagonal variances based at least in part on the example equations (9) and (10). In some examples, the computing system determines diagonal variances as described above with regard to FIGS. 3A-C and the example equations (9) and (10).

Based on the set of diagonal direction pixel differences and/or the diagonal variances corresponding to the target pixel, the computing device determines an orientation for the target pixel (block 410). In some examples, determining an orientation for the target pixel may comprise determining whether the target pixel corresponds to a 45° sloped edge, determining whether the target pixel corresponds to a 135° sloped edge, determining whether the target pixel corresponds to an edge pixel, determining whether the target pixel corresponds to a feature preserve pixel, and/or determining whether the target pixel corresponds to a corner preserve pixel. In some examples, an orientation for the target pixel is determined at block 410 as described in the example flowchart provided in FIG. 4 and according to the example conditions (A) to (H) provided below.

Based on the set of diagonal direction differences corresponding to the target pixel, the diagonal variances corresponding to the target pixel, and/or the orientation of the target pixel, the computing device determines whether to process the target pixel (block 412). In some examples, the computing device may determine to process the target pixel if the target pixel corresponds to a forty-five degree (45°) sloped edge or a one-hundred and thirty-five degree (135°) sloped edge. In addition, in some examples, the computing device may determine to process the target pixel if the target pixel corresponds to an edge pixel, a feature preserve pixel, and/or a corner preserve pixel. In some examples, the computing device may determine whether to process the target pixel in block 412 as described in the example flowchart provided in FIG. 4 and according to the example conditions (A) to (H) provided below.

In response to determining to process the target pixel ("Y" branch of block 412), the computing device processes the target pixel into a set of sub-pixels (block 414), where the each sub-pixel comprises pixel values based at least in part on the pixel value of the target pixel, the orientation of the target pixel, the set of diagonal pixel differences corresponding to the target pixel, and/or the diagonal variances corresponding to the target pixel. In some examples, processing a target pixel may comprise replacing the target pixel with four sub-pixels, where the pixel values of each sub-pixel may be set independently. Generally, each sub-pixel has a pixel size that is fractionally related to the target pixel such that more detail may be illustrated in area of the digital image represented by the target pixel. For example, the target pixel may be processed into four sub-pixels, where each sub-pixel corresponds to one fourth of the area of the target pixel. Furthermore, when the target pixel is processed, each sub-pixel may have pixel values that differ from the pixel values of the target pixel. In some examples, the computing device may process the target pixel into the set of subpixels as described below in the flowchart of FIG. 5 and according to the example equations (11) and (12) provided below. In response to determining to not process the target pixel ("N" branch of block 412), the computing system replaces the target pixel with a set of sub-pixels that each have the same pixel values as the target pixel (block 416).

As will be appreciated, a digital image may be scaled by adjusting one or more target pixels of the digital image. Hence, while some examples described in the description reference a single target pixel, the description is not so limited. Generally, an example computing device may analyze and process one or more target pixels sequentially and/or concurrently. Accordingly, in FIG. 4 the computing device may determine whether any additional target pixels remain to be processed (block 416). Therefore, in this example, the computing device may process at least some target pixels sequentially. Other configurations may be implemented. For example, the computing device may determine some or all target pixels concurrently. If the computing device determines that target pixels remain to be processed ("Y" branch of block 418), the computing device begins analysis on the next target pixel (block 420), and repeats the process described with regard to blocks 404-418 for the next target pixel. If the computing device determines that target pixels do not remain to be processed ("N" branch of block 418), the computing device thereby generates a scaled digital image (block 422).

Turning now to FIG. 5, this figure provides an example sequence of operations that may be performed by an example computing device to determine an orientation of a target pixel based at least in part on a set of diagonal direction pixel differences and diagonal variances corresponding to the target pixel (block 502). As shown, the example computing device determines whether the target pixel corresponds to a 45° sloped edge or a 135° sloped edge (block 504). Generally, a target pixel may be determined to correspond to a 45° sloped edge or a 135° sloped edge based at least in part on the set of diagonal direction pixel differences and diagonal variances corresponding to the target pixel. In some examples, the computing device may determine that the target pixel corresponds to a 45° sloped edge or a 135° sloped edge if diagonal differences on either side of the target pixel are both the same sign (positive or negative), the diagonal differences are larger than a predefined threshold, the differences are larger than the complementary differences of the opposite direction, and the differences are larger than the variance across the target pixel in the opposite direction.

For example, referring to the example diagonal direction pixel differences of FIGS. 3B-C and the example equations (1) to (10), a target pixel may be determined to correspond to a 45° sloped edge in block 504 based on the following example conditions:

$$((G3 < -THRESH1) \text{ AND } (G4 < -THRESH1))(\text{OR}) \quad (A)$$

$$((G3 > THRESH1) \text{ AND } (G4 > THRESH1))(\text{AND})$$

$$(|G3 + G4| > (2*|G1 + G2|))(\text{AND})\left(|G3 + G4| > \frac{|V5|}{2}\right).$$

Similarly, a target pixel may be determined to correspond to a 135° sloped edge in block 504 based on the following example conditions:

$$((G1 < -THRESH1) \text{ AND } (G2 < -THRESH1))(\text{OR}) \quad (B)$$

$$((G1 > THRESH1) \text{ AND } (G2 > THRESH1))(\text{AND})$$

$$(|G1 + G2| > (2*|G3 + G4|))(\text{AND})\left(|G1 + G2| > \frac{|V6|}{2}\right).$$

Generally, THRESH1 corresponds to a predefined threshold value that is set to address noise issues in the digital image. In some examples, THRESH1 is a non-zero value that is a relatively low value of the possible scale of pixel values. For example, in a digital image in which a pixel value is an 8-bit value (i.e., the possible scale is 0 to 255), THRESH1 may be 0.5, 1, 12, or some other similar, relatively low, non-zero value. THRESH1 may be set based on the pixel values and/or the amount of noise expected in digital images processed by, the example computing device.

As shown in FIG. 5, responsive to determining that the target pixel does not correspond to a 45° sloped edge or a 135° sloped edge ("N" branch of block 504), the computing device does not process the target pixel (block 505). Generally, not processing a target pixel may comprise replacing the target pixel with a set of subpixels that each have a respective pixel value that is equal to the pixel value of the target pixel. For example, if a pixel for a text image is black (e.g., the example pixel value is 0), the set of subpixels will be black as well (e.g., the example respective pixel values will be 0).

In response to determining that the target pixel corresponds to a 45° sloped edge or a 135° sloped edge ("Y" branch of block 504), the example computing device determines whether the target pixel corresponds to an edge pixel for which processing may potentially be performed (block 506), which may be referred to as an edge pixel candidate. In some examples, the computing device determines whether the target pixel corresponds to an edge pixel for which processing may potentially be performed based at least in part on the target pixel's pixel value, the pixel values of one or more other pixels of the region of pixels, the set of diagonal direction pixel differences, and/or the diagonal variances. For example, in a binary image (e.g., black and white image), the computing device may determine whether the target pixel is a black pixel or a white pixel, and the computing device may only process white pixels, such that detail may not be removed by processing a black pixel into a set of one or more white subpixels. Therefore, in some examples, the computing device determines to potentially process target pixels along an edge having lighter visual components (e.g., white pixels), where the computing device may determine respective pixel values for of one or more subpixels associated with a lighter relative target pixel to be a darker value, thereby providing additional detail to an edge.

For example, referring to the example diagonal direction pixel differences of FIGS. 3B-C and the example equations (1) to (10), the example computing device may determine that the target pixel corresponds to an edge pixel for which processing may potentially be performed in block 506, when the target pixel corresponds to a 45° sloped edge, based at least in part on the following example condition:

$$\text{NOT}[((|V5|<\text{THRESH1}) \text{ AND } (V6<-\text{THRESH2}))]. \quad (C)$$

Similarly, the example computing device may determine that the target pixel corresponds to an edge pixel for which processing may potentially be performed in block 506, when the target pixel corresponds to a 135° sloped edge, based at least in part on the following example condition:

$$\text{NOT}[((|V6|<\text{THRESH1}) \text{ AND } (V5<-\text{THRESH2}))]. \quad (D)$$

In these examples, THRESH2 may be set to a value similar to THRESH1—i.e., a relatively low with respect to the scale of possible pixel values, non-zero value, such as 0.5, 1, 12, 16, etc.

In response to determining that the target pixel does not correspond to an edge pixel for which processing may potentially be performed ("N" branch of block 506), the example computing device does not process the pixel (block 505). In response to determining that the target pixel corresponds to an edge pixel for which processing may potentially be performed ("Y" branch of block 506), the example computing device may determine whether the target pixel corresponds to a feature preserve pixel for which processing may potentially be performed (block 508), which may be referred to as a feature preserve pixel candidate.

In some examples, a feature preserve pixel generally corresponds to a pixel that is associated with a connection of a feature in a digital image. Similar to an edge pixel, example computing devices as described herein may generally be configured to process relatively lighter pixel value pixels to further define the connection of the feature, and example computing devices may not process relatively darker pixel value pixels such that the feature connected by the dark pixel, may not be processed into one or more relatively lighter value subpixels. In some examples, the computing device determines that the target pixel does not correspond to a feature preserve pixel for which processing may potentially be performed based at least in part on whether low variance occurs through the target pixel across the edge, and the computing device determines that a high increase in pixel value occurs along the edge, from the target pixel, in both directions.

For example, referring to the example diagonal direction pixel differences of FIGS. 3B-C and the example equations (1) to (10), the example computing device may determine that the target pixel corresponds to a feature preserve pixel for which processing may potentially be performed in block 508, when the target pixel corresponds to a 45° sloped edge, based at least in part on the following example condition:

NOT[(|V6|<THRESH1) and (G5<−THRESH2) AND
G6<−THRESH2.     (E)

Similarly, the example computing device may determine that the target pixel corresponds to a feature preserve pixel for which processing may potentially be performed in block 508 when the target pixel corresponds to a 135° sloped edge, based at least in part on the following example condition:

NOT[(|V5|<THRESH1) AND (G7<−THRESH2)
AND G8<−THRESH2.     (F)

In response to determining that the target pixel does not correspond to a feature preserve pixel for which processing may potentially be performed ("N" branch of block 508), the example computing device does not process the target pixel (block 505). In response to determining that the target pixel corresponds to a feature preserve pixel for which processing may potentially be performed ("Y" branch of block 508) the computing device determines whether the target pixel corresponds to a corner preserve pixel for which processing may potentially, be performed (block 510), which may be referred to as a corner preserve pixel candidate.

Generally, a corner preserve pixel for which processing may potentially be performed may correspond to a pixel having a relatively lighter pixel value than neighboring pixels associated with a feature corner in an image. Example computing devices may process the pixel having the relatively lighter pixel value such that a corner may be further defined in a scaled image. However, example computing systems may determine that a target pixel having a relatively darker pixel value than neighboring pixels associated with a feature corner does not correspond to a corner preserve pixel for which processing may potentially occur.

For example, referring to the example diagonal direction pixel differences of FIGS. 3B-C and the example equations (1) to (10), the example computing device may determine that the target pixel corresponds to a corner preserve pixel for which processing may potentially be performed in block 510, when the target pixel corresponds to a 45° sloped edge, based at least in part on the following example condition:

NOT[((G7<−THRESH2)≠(G8<−THRESH2)) AND
(G5<−THRESH2) AND (G6<−THRESH2)].     (G)

Similarly, the example computing device may determine that the target pixel corresponds to a corner preserve pixel for which processing may potentially be performed in block 510, when the target pixel corresponds to a 135° sloped edge, based at least in part on the following example condition:

NOT [((G5<−THRESH2)≠(G6<−THRESH2)) AND
(G7<−THRESH2) AND (G8<−THRESH2)].     (H)

In response to determining that the target pixel does not correspond to a corner preserve pixel for which processing may potentially be performed (IT branch of block 510), the example computing device does not process the target pixel (block 505). In response to determining that the target pixel corresponds to a corner preserve pixel for which processing may potentially be performed ("Y" branch of block 510) the computing device processes the target pixel (block 512).

In general, processing the target pixel comprises processing the target pixel into a set of subpixels each having a respective pixel value, where some of the respective pixel values may be determined based at least in part on pixel values of other pixels of the region of pixels.

For example, a target pixel may be processed into a set of four subpixels. For reference purposes, the four subpixels may be referred to as an upper left (UL) subpixel, an upper right (UR) subpixel, a lower left (LL) subpixel, and a lower right (LR) subpixel. In these examples, if the target pixel corresponds to a 45° sloped edge, the target pixel may be processed into the set of subpixels in block 512 and the respective pixel values of the subpixels may be determined based at least in part on the following example equation:

$$UL = \frac{P1+P3}{2}; UR = P4; L = P4; LR = \frac{P5+P7}{2}. \quad (11)$$

Continuing the example, if the target pixel corresponds to a 135° sloped edge, the target pixel may be processed into the set of subpixels in block 512 and the respective pixel values of the subpixels may be determined based at least in part on the following example equation:

$$UL = P4; R = \frac{P1+P5}{2}; LL = \frac{P3+P7}{2}; LR = P4. \quad (12)$$

With regard to the example flowchart 500, the edge pixel check of block 506, the feature preserve pixel check of block 508, and the corner preserve pixel check of block 510 may be performed in any order. In some examples, a target pixel may generally be evaluated as described with regard to blocks 506-510, and a target pixel may be processed responsive to determining that the target pixel corresponds to each characteristic evaluated in blocks 506-510. Therefore, in some examples, a target pixel is evaluated to determine whether the target pixel is an edge pixel candidate, a feature preserve pixel candidate, and/or a corner preserve pixel candidate, and the target pixel may be processed based at least in part on the determinations. As will be appreciated, determining an orientation of a target pixel may comprise determining whether the target pixel corresponds to a 45° sloped edge or a 135° sloped edge. In addition, determining an orientation of a target pixel may comprise determining whether the target pixel is an edge pixel candidate, a feature preserve pixel candidate, and/or a corner preserve pixel candidate.

FIGS. 6A-C are block diagrams that illustrate an example processing of an example target pixel 600 that may be performed by an example computing device. FIG. 6A provides an example a region of pixels 602 (labeled P0 to P8) that includes the example target pixel 600 (also labeled P4). In this example, the digital image is binary (e.g., black and white) where a pixel having a black color may have a pixel value of 0, and a pixel having a white color may have a pixel value of 255. Referring to the example equations (1) to (8), example diagonal direction pixel differences corresponding to the example target pixel 600 (i.e., pixel P4) may be determined as follows: G1=63.75; G2=63.75; G3=0; G4=0; G5=0; G6=63.75, G7=0; and G8=0. Referring to the example equations (9) and (10), the example diagonal variances corresponding to the target pixel 600 may be determined as follows: V5=31.875: and V6=0.

For this example, the target pixel 600 may be determined to correspond to a 135' sloped edge (based on example conditions (B)); the target pixel may be determined to correspond to an edge pixel for which processing may potentially be performed (based on example condition (D)); the target pixel may be determined to correspond to a feature preserve pixel for which processing may potentially be performed (based on example condition (F)); and the target pixel may be determined to correspond to a corner preserve pixel for which processing may potentially be performed (based on example condition (H). Therefore, in this example, the computing device may determine that the target pixel 600 should be processed, and the computing device processes the example target pixel 608 into a set of four subpixels 604 (labeled UL, UR, LL, LR). Based on the example equation (12), the respective pixel values for the subpixels may be determined to be: UL=255 (i.e., white); UR=255 (white), LL=0 (black); and LR=255 (white). Therefore, as shown in this example, the LL subpixel comprises a respective pixel value that differs from the pixel value of the target pixel 600. FIG. 6C provides an example portion 606 of a scaled digital image corresponding to the region of pixels 602. As shown in FIG. 6C, the target pixel 608 has been processed into the set of subpixels 604.

FIGS. 7A-C provide block diagrams that illustrate an example portion of a digital image corresponding to an example target pixel 700 that may not be processed when the digital image is scaled. A region of pixels 702 (labeled P0 to P8) including the target pixel 700 (also labeled P4) are shown in FIG. 7A. In this example, the digital image is binary (e.g., black and white) where a pixel having a black color may have a pixel value of 0, and a pixel having a white color may have a pixel value of 255. Referring to the example equations (1) to (8), example diagonal direction pixel differences corresponding to the example target pixel 700 (i.e., pixel P4) may be determined as follows: G1=0; G2=0; G3=−63.75; G4=−63.75; G5=0; G6=0; G7=−63.75; and G8=0. Referring to the example equations (9) and (10), the example diagonal variances corresponding to the target pixel 600 may be determined as follows; V5=0; and V6=−31.875.

For this example, the target pixel 700 may be determined to correspond to a 45° sloped edge (based on example condition (B)). However, the target pixel 700 is not determined to correspond to an edge for which processing may potentially be performed (based on example condition (C)). Therefore, in this example, the target pixel 700 is not processed into a set of subpixels that may have difference respective pixel values. Instead, the target pixel 700 may be replaced by a set of subpixels having respective pixel values equal to the pixel value of the target pixel. FIG. 7B illustrates the example set of subpixels 704 (labeled UL, UR, LL, LR). In FIG. 7C, the target pixel 700 of the digital image portion shown in the region of pixels 702 of FIG. 7A has been replaced with the set of subpixels 704 for the corresponding portion of a scaled digital image 706.

FIGS. 8A and 8B provide block diagrams of example target pixels 802, 804 associated with a feature preserve pixel determination, FIG. 8A provides an example target pixel 802 and an example region of pixels 806 (labeled P0 to P8) corresponding to the example target pixel 802 (also labeled P4). In FIG. 8A, an example portion of a scaled digital image 808 is provided where the example target pixel 802 is processed into a set of subpixels 810 (labeled UL, UR, LL, LR). As shown, processing of the example target pixel 802 caused the UR subpixel to have a different respective pixel value than the target pixel 802, which, in turn caused a disconnection of a feature in the example portion of the scaled digital image 808.

FIG. 8B provides an example region of pixels 820 (labeled P0 to P8) corresponding to the target pixel 804 (also labeled P4). In FIG. 8B, an example portion of a scaled digital image 822 is provided where the example target pixel 804 is processed into a set of subpixels 824 (labeled UL, UR, LL, LR). As shown, processing of the example target pixel 804 caused the UR subpixel to have a different respective pixel value than the target pixel 804, which, in turn caused additional detail to be added to a feature in the example portion of the scaled digital image 822. Accordingly, example computing devices may generally distinguish between the case illustrated by the example of FIG. 8A and the case illustrated by the example of FIG. 8B such that computing devices process target pixels similar to the example target pixel 804 of FIG. 8B and not process target pixels similar to the example target pixel 802 of FIG. 8A.

FIGS. 9A and 9B provide block diagrams of, example target pixels 902, 904 associated with a corner preserve pixel determination. FIG. 9A provides an example target pixel 902 and an example region of pixels 906 (labeled P0 to P8) corresponding to the example target pixel 902 (also labeled P4) In FIG. 9A, an example portion of a scaled digital image 908 is provided where processing of the example target pixel 902 processed the target pixel 902 into a set of subpixels 910 (labeled UL, UR, LL, LR). As shown, processing of the example target pixel 902 caused the UR subpixel corresponding to the example target pixel 902 to have a different respective pixel value than the target pixel 902, which, in turn caused a corner of a feature in the example portion of the scaled digital image 808 to degrade.

FIG. 9B provides an example region of pixels 920 (labeled P0 to P8) corresponding to the target pixel 804 (also labeled P4). In FIG. 9B, an example portion of a scaled digital image 922 is provided where the example target pixel 904 is processed into a set of subpixels 924 (labeled UL, UR, LL, LR). As shown, processing of the example target pixel 904 caused the UR subpixel to have a different respective pixel value than the target pixel 904, which, in turn caused additional detail to be added to a corner in the example portion of the scaled digital image 922. Accordingly, example computing devices may generally distinguish between the case illustrated by the example of FIG. 9A and the case illustrated by the example of FIG. 9B such that target pixels such as the example target pixel 904 of FIG. 9B are processed, and target pixels such as the example target pixel 902 of FIG. 9A are not processed.

FIGS. 10A and 10B are block diagrams that illustrate an example processing of text of a digital image. FIG. 10A provides an example portion of a digital image 950, and FIG. 10B provides a portion of a scaled digital image 952 corresponding to the portion of the digital image 950 of FIG. 1. The example portion of the scaled digital image 952 may be generated by processing the portion of the digital image 950 according to the image analysis and scaling processes described herein.

Therefore, examples of computing devices, processes, methods, and/or computer program products implemented as executable instructions stored on a non-transitory machine-readable storage medium described herein may scale digital images prior to output with a printing device and/or other such visual output device. In some examples, the digital image may be upscaled to generate a scaled digital image by processing one or more target pixels into sets of subpixels. Some examples may determine a set of diagonal direction pixel differences corresponding to a target pixel and diagonal variances corresponding to the target pixel. Based on the diagonal direction pixel differences and the diagonal variances, some examples may determine an orientation of the target pixel. Based on the orientation of the target pixel, examples may determine whether to process the target pixel. Generally, examples may determine some respective pixel values for subpixels of a set associated with a target pixel based at least in part on pixel values of one or more other pixels of a region of pixels corresponding to the target pixel. Some examples may analyze some or all of the pixels of a digital image as a target pixel, and the examples may process some or all of the target pixels as described herein to thereby generate a scaled digital image.

In addition, while various examples are described herein, elements and/or combinations of elements may be combined and/or removed for various examples contemplated hereby. For example, the example operations provided herein in the flowcharts of FIGS. 4-5 may be performed sequentially, concurrently, or in a different order. Moreover, some example operations of the flowcharts may be added to other flowcharts, and/or some example operations may be removed from flowcharts. Furthermore, in some examples, various components of the example computing devices of FIGS. 1 and 2 may be removed, and/or other components may be added. Similarly, in some examples various instructions of the example memories anchor machine-readable storage mediums of FIG. 1 may be removed, and/or other instructions may be added (such as instructions corresponding to the example operations of FIGS. 4 and 5).

The preceding description has been presented to illustrate and describe examples of the principles described. This description is not intended to be exhaustive or to limit examples to any precise form disclosed. Many modifications and variations are possible in light of this description,

The invention claimed is:

1. A non-transitory machine-readable storage medium comprising instructions executable by a processing resource of a computing device to cause the computing device to:
for a digital image, analyze a region of pixels including a target pixel to determine a set of diagonal direction pixel differences corresponding to the target pixel, including a difference between a value of each pixel diagonally adjacent to the target pixel and a value of the target pixel;
analyze the region of pixels to determine diagonal variances corresponding to the target pixel, including a first variance of the differences corresponding to the pixels diagonally adjacent to the target pixel along a first direction and a second variance of the differences corresponding to the pixels diagonally adjacent to the target pixel along a second direction perpendicular to the first direction;
scale the digital image by processing the target pixel into a set of subpixels based on the set of diagonal direction pixel differences and the diagonal variances; and
output a scaled digital image produced by the scaling to cause printing by a printing device using the scaled digital image.

2. The non-transitory machine-readable storage medium of claim 1, further comprising instructions to:
determine whether to process the target pixel based on the set of diagonal direction pixel differences and the diagonal variances.

3. The non-transitory machine-readable storage medium of claim 2, wherein the instructions to determine whether to process the target pixel based on the set of diagonal direction pixel differences and the diagonal variances comprises instructions to:
determine an orientation of the target pixel based on the set of diagonal direction pixel differences corresponding to the target pixel and the diagonal variances corresponding to the target pixel.

4. The non-transitory machine-readable storage medium of claim 3 wherein the instructions to determine the orientation of the target pixel comprise instructions to:
determine whether the target pixel corresponds to a forty five degree or a one-hundred and thirty five degree sloped edge based on the set of diagonal direction pixel differences corresponding to the target pixel and the diagonal variances corresponding to the target pixel.

5. The non-transitory machine-readable storage medium of claim 3, wherein the instructions to determine the orientation of the target pixel comprise instructions to:
determine whether the target pixel corresponds to an edge pixel based on the set of diagonal direction pixel differences corresponding to the target pixel and the diagonal variances corresponding to the target pixel;
determine whether the target pixel corresponds to a feature preserve pixel based on the set of diagonal direction pixel differences corresponding to the target pixel and the diagonal variances corresponding to the target pixel; and
determine whether the target pixel corresponds to a corner preserve pixel based on the set of diagonal direction pixel differences corresponding to the target pixel and the diagonal variances corresponding to the target pixel.

6. The non-transitory machine-readable storage medium of claim 1, wherein the instructions to scale the digital image by processing the target pixel into the set of subpixels comprises instructions to:
determine a respective pixel value for each subpixel of the set of subpixels based on a pixel value of at least one other pixel of the region of pixels.

7. The non-transitory machine-readable storage medium of claim 1, wherein the set of subpixels comprises an upper-left subpixel, an upper-right subpixel, a lower-left subpixel, and a lower-right subpixel, and the instructions to scale the digital image by processing the target pixel into the set of subpixels comprises instructions to:
determine a respective pixel value for the upper-right subpixel and the lower-left subpixel based on an average pixel value of at least two other pixels of the region of pixels responsive to a determination that the target pixel corresponds to a one-hundred and thirty-five degree sloped edge.

8. The non-transitory machine-readable storage medium of claim 1, wherein the set of subpixels comprises an upper-left subpixel, an upper-right subpixel, a lower-left subpixel, and a lower-right subpixel, and the instructions to scale the digital image by processing the target pixel into the set of subpixels comprises instructions to:
determine a respective pixel value for the upper-left subpixel and the lower-right subpixel based on an average pixel value of at least two other pixels of the region of pixels responsive to a determination that the target pixel corresponds to a forty-five degree sloped edge.

9. A method performed by at least one hardware processor, comprising:
for each of a plurality of target pixels of a digital image:
analyzing a pixel value for each pixel of a region of pixels that includes a target pixel to determine a set of diagonal direction pixel differences corresponding to the target pixel, including:
a first difference between the pixel value of the target pixel and the pixel value of the pixel to an upper right of the target pixel;
a second difference between the pixel value of the target pixel and the pixel value of the pixel to a lower left of the target pixel;
a third difference between the pixel value of the target pixel and the pixel value of the pixel to an upper left of the target pixel;
a fourth difference between the pixel value of the target pixel and the pixel value of the pixel to a lower right of the target pixel;
after determining the set of diagonal direction pixel differences, determining diagonal variances corresponding to the target pixel, including a first variance of the first and second differences and a second variance of the third and fourth differences;
analyzing the set of diagonal pixel differences corresponding to the target pixel to determine an orientation of the target pixel;
determining whether to process the target pixel based on the orientation of the target pixel;
in response to determining to process the target pixel, processing the target pixel into a set of subpixels, wherein a size of each subpixel of the set of subpixels is less than a size of the target pixel; and
output a processed digital image produced by the processing to cause printing by a printing device using the processed digital image.

10. The method of claim 9, further comprising:
determining, for each subpixel of the set of subpixels, a respective pixel value based on the orientation of the particular target pixel.

11. The method of claim 9, further comprising:
generating a scaled digital image for a digital image that comprises the set of subpixels.

12. A computing device comprising:
a processor; and
a non-transitory storage medium storing instructions executable on the processor to:
analyze pixels of a region of pixels to determine a set of diagonal direction pixel differences corresponding to a target pixel of a digital image, including a difference between a value of each pixel diagonally adjacent to the target pixel and a value of the target pixel;
analyze the pixels of the region of pixels to determine diagonal variances corresponding to the target pixel, including a variance of the differences corresponding to the pixels to an upper right and a lower left of the target pixel and a variance of the differences corresponding to the pixels to an upper left and a lower right of the target pixel;
determine an orientation of the target pixel based on the set of diagonal direction pixel differences and the diagonal variances;
generate a scaled digital image by processing the target pixel based on a pixel value of each pixel of the region of pixels and the orientation of the target pixel; and
output the scaled digital image produced to cause printing of the scaled digital image by a printing device.

13. The computing device of claim 12, further comprising:
a printhead to print the scaled digital image onto a physical medium.

14. The computing device of claim 12, further comprising:
a user interface device to output the scaled digital image.

15. The computing device of claim 12, wherein the region of pixels comprises a three-pixel by three-pixel area having the target pixel in the center of the area.

16. The non-transitory machine-readable storage medium of claim 1, wherein a size of each subpixel of the set of subpixels is less than a size of the target pixel.

17. The non-transitory machine-readable storage medium of claim 16, wherein the set of subpixels collectively are within an area of the target pixel.

18. The non-transitory machine-readable storage medium of claim 1, wherein each diagonal direction pixel difference of the set of diagonal direction pixel differences is computed based on pixel values of diagonally arranged pixels of the region of pixels, and wherein the diagonal variances are computed after the set of diagonal direction pixel differences is computed.

19. The method of claim 9, wherein each subpixel of the set of subpixels is a fractional size of the target pixel.

20. The computing device of claim 12, wherein the processing of the target pixel to generate the scaled digital image comprises producing a set of subpixels from the target pixel, and wherein a size of each subpixel of the set of subpixels is less than a size of the target pixel.

* * * * *